US012298004B2

(12) United States Patent
Lappalainen et al.

(10) Patent No.: US 12,298,004 B2
(45) Date of Patent: May 13, 2025

(54) DETERMINING ONE OR MORE PROPORTIONAL PARTICLE GROUP SHARES IN FLUE GAS OF A RECOVERY BOILER

(71) Applicant: ANDRITZ OY, Helsinki (FI)

(72) Inventors: Heikki Lappalainen, Varkaus (FI); Petri Pynnönen, Kotka (FI)

(73) Assignee: Andritz Oy, Helsinki (FI)

( * ) Notice: Subject to any disclaimer, the term of this patent is extended or adjusted under 35 U.S.C. 154(b) by 512 days.

(21) Appl. No.: 17/623,151

(22) PCT Filed: Jun. 25, 2020

(86) PCT No.: PCT/FI2020/050456
§ 371 (c)(1),
(2) Date: Dec. 27, 2021

(87) PCT Pub. No.: WO2020/260762
PCT Pub. Date: Dec. 30, 2020

(65) Prior Publication Data
US 2022/0268442 A1 Aug. 25, 2022

(30) Foreign Application Priority Data
Jun. 28, 2019 (FI) .................................... 20195580

(51) Int. Cl.
*F23N 5/26* (2006.01)
*D21C 11/06* (2006.01)
(Continued)

(52) U.S. Cl.
CPC .............. *F23N 5/265* (2013.01); *D21C 11/06* (2013.01); *D21C 11/12* (2013.01); *F27D 19/00* (2013.01);
(Continued)

(58) Field of Classification Search
CPC ........... G01N 15/0612; G01N 15/1433; G01N 15/1436; G01N 2015/0046;
(Continued)

(56) References Cited

U.S. PATENT DOCUMENTS

| 4,408,568 A * | 10/1983 | Wynnyckyj ............. | F22B 37/56 122/379 |
| 4,683,841 A * | 8/1987 | Andersson ............. | D21C 11/12 110/238 |

(Continued)

FOREIGN PATENT DOCUMENTS

| JP | 60-100032 | 6/1985 |
| JP | S63-091416 A | 4/1988 |

(Continued)

OTHER PUBLICATIONS

International Search Report for PCT/FI2020/050456 dated Nov. 4, 2020, 6 pages.
(Continued)

*Primary Examiner* — Sang H Nguyen
(74) *Attorney, Agent, or Firm* — Nixon & Vanderhye P.C.

(57) ABSTRACT

A method and system to determine one or more proportional particle group shares in flue gas of a recovery boiler (110) based on optical information gained from a flue gas sample. A processor (202) is used to read (301) a digital frame comprising the area under consideration, which represents at least a part of the surface of a sampler (120) kept in the flue gas flow of a recovery boiler. Particle group areas matching a color characteristic of the particle group comprised in the flue gas is determined (302) from the area under consideration. The joint area of the identified particle group areas is determined (304), and the share of the joint area from the total area is determined (305) as the proportional particle group share of the particle group.

21 Claims, 6 Drawing Sheets

Figure 1A:
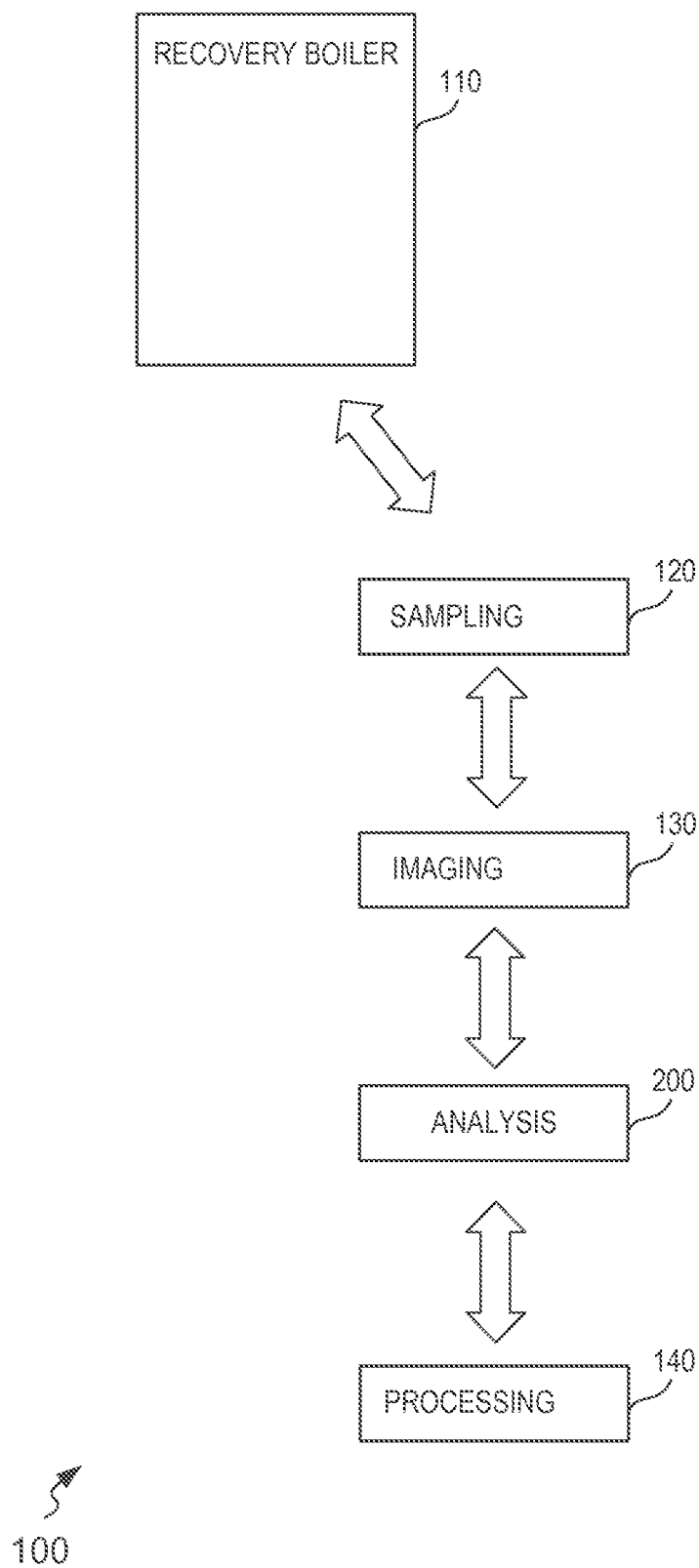

(51) Int. Cl.
*D21C 11/12* (2006.01)
*F27D 19/00* (2006.01)
*F27D 21/02* (2006.01)
*G01N 15/14* (2024.01)
*G01N 15/1433* (2024.01)
*G01N 15/1434* (2024.01)

(52) U.S. Cl.
CPC ......... *F27D 21/02* (2013.01); *G01N 15/1433* (2024.01); *G01N 15/1436* (2013.01); *F27D 2021/026* (2013.01); *G01N 2015/1443* (2013.01)

(58) Field of Classification Search
CPC ............ G01N 2015/1443; D21C 11/06; D21C 11/12; F27D 19/00; F27D 21/02; F27D 2021/026; F23N 5/265
See application file for complete search history.

(56) References Cited

U.S. PATENT DOCUMENTS

| | | | | |
|---|---|---|---|---|
| 4,891,097 | A * | 1/1990 | Hyoty | D21C 11/12 110/238 |
| 5,176,723 | A * | 1/1993 | Liu | B01D 47/10 95/216 |
| 6,490,040 | B1 * | 12/2002 | Berthold | G01N 21/53 356/438 |
| 8,584,540 | B2 | 11/2013 | Dahlen et al. | |
| 2009/0139468 | A1 * | 6/2009 | Saviharju | G01N 21/84 122/448.1 |
| 2011/0056313 | A1 | 3/2011 | Dahlen et al. | |
| 2012/0053720 | A1 * | 3/2012 | Mathur | G05B 13/042 703/2 |
| 2013/0161563 | A1 * | 6/2013 | Jiang | C10B 49/22 252/373 |
| 2013/0165534 | A1 * | 6/2013 | McComish | C10J 3/82 422/139 |
| 2015/0219547 | A1 | 8/2015 | Takakura | |
| 2015/0275108 | A1 * | 10/2015 | Gueh | C10J 3/57 422/232 |
| 2017/0131240 | A1 * | 5/2017 | Aura | D21C 11/10 |

FOREIGN PATENT DOCUMENTS

| | | |
|---|---|---|
| JP | 1-307638 | 12/1989 |
| JP | 06-194307 | 7/1994 |
| JP | H10-332567 A | 12/1998 |
| JP | 2002-333402 A1 | 11/2002 |
| JP | 2003-302333 A | 10/2003 |
| JP | 2008-519231 A | 6/2008 |

OTHER PUBLICATIONS

Written Opinion of the ISA for PCT/FI2020/050456 dated Nov. 4, 2020, 9 pages.
Russian Office Action cited in Application No. 2022101679 with Translation mailed Dec. 27, 2023, 15 pages.
Russian Search Report cited in Application No. 2022101679 mailed Dec. 26, 2023, 2 pages.
Japanese Office Action with Translation cited in Application No. 2021-574755 mailed Dec. 27, 2023, 8 pages.
Juho Nurmi, "Soodakattilan Reduktion Määrittäminen Visuaalisella Analyysillä", Apr. 15, 2019, (with English Abstract) 51 pages.

* cited by examiner

410

420

510

520

DETERMINING ONE OR MORE PROPORTIONAL PARTICLE GROUP SHARES IN FLUE GAS OF A RECOVERY BOILER

RELATED APPLICATION

This application is the U.S. national phase of International Application PCT/FI2020/050456, filed Jun. 25, 2020, which designated the U.S. and claims priority to Finnish Patent Application 20195580 filed Jun. 28, 2019, the entire contents of each of which are hereby incorporated by reference.

FIELD OF THE INVENTION

The invention relates to determining one or more proportional particle group shares in flue gas of a recovery boiler based on optical information gained from a flue gas sample.

STATE OF THE ART

In principle, a recovery boiler has two primary functions: chemical recovery and the recovery of combustion heat generated in the process as steam and electric energy.

During recovery boiler combustion, flue gases are generated, the heat of which is used for steam production. These flue gases typically include particles (among others so-called carry-over particles), which generate from black liquor in the combustion process of the furnace. These particles are so light that they are easily drawn into the powerful flue gas flow. The carry-over particles are particularly difficult because they are sticky when the heating surfaces are in the $T_{I5}$-$T_{70}$ range (temperature range wherein 15-70% of ash is in a liquid form). The particularly powerful drawing into the flue gas flow of these particles results from the so-called chimney effect wherein the boiler draught changes to favour a particular furnace area. For example, in the middle of the furnace, the flow rates can increase so that particles of a suitable size and melted drops of fuel are drawn into the flue gas flow, forming carry over alongside the residual ash of normally combusted fuel.

The carry-over particles cause fouling and corrosion of the heating surfaces, both of which significantly reduce the availability of the recovery boiler and, at the same time, reduce the recovery of recyclable chemicals and steam production.

Monitoring of carry-over has been sought, for example, with a spark counter, which counts the still glowing flue gas particles detected in the detection area of its probe. Such an arrangement only registers the part of carry-over, wherein the combustion of coke is still ongoing. This arrangement is not able to register the part of carry-over, which no longer combusts but is still in a reduced form.

The prior art also includes publication U.S. Pat. No. 8,584,540 B2, which describes the use of a sweeper to measure the conditions of the recovery boiler furnace.

SUMMARY OF THE INVENTION

In accordance with the first characteristic of the present invention, a method is presented for determining one or more proportional particle group shares in flue gas of a recovery boiler. The method comprises the steps of:

reading with a processor a digital frame, which comprises the area under consideration, which represents at least a part of the surface of a sampler kept in the flue gas flow of a recovery boiler for a predetermined period of time;

identifying with a processor from the area under consideration one or more particle group areas matching the predetermined colour characteristic of at least one particle group comprised in the flue gas of the recovery boiler;

determining with a processor the joint area of the identified one or more particle group areas; and determining with a processor the share of the determined joint area from the predetermined total area as the proportional particle group share of the said particle group.

In accordance with the second characteristic of the present invention, a computer program product is presented comprising at least one computer-readable storage medium comprising a group of commands that, when run by one or more processors, make a computer device carry out the method according to the first characteristic.

In accordance with the third characteristic of the present invention, a computer device is presented comprising: at least one processor; and at least one memory comprising computer program code, wherein the at least one memory and the computer program code have been arranged with at least one processor to make the computer device:

read a digital frame, which comprises the area under consideration, which represents at least a part of the surface of a sampler kept in the flue gas flow of the recovery boiler for a predetermined period of time;

identify from the area under consideration one or more particle group areas matching the predetermined colour characteristic of at least one particle group included in flue gas of the recovery boiler;

determine the joint area of the identified one or more particle group areas; and determine the share of the determined joint area from the predetermined total area as the proportional particle group share of the said particle group.

In accordance with the fourth characteristic of the present invention, a system is represented comprising:

a sampler for taking a sample from the flue gas flow of a recovery boiler;

means for generating a digital frame from a flue gas sample taken from the recovery boiler with the sampler; and a computer device in accordance with the characteristic.

In one application of the invention, the identification of the particle group area, the determination of the joint area and the determination of the share of the joint area from the total area is carried out for at least two different particle groups included in flue gas of the recovery boiler.

In one application of the invention, the predetermined total area comprises the total area of the area under consideration.

In one application of the invention, the predetermined total area comprises the total area of the joint areas of the said at least two different particle groups.

In one application of the invention, it is determined with a processor that at least one possible overlapping area of the particle group areas belongs to one of the said particle group areas based on the darkness of the said possible overlapping area.

In one application of the invention, the particle group comprises one of the following: sodium sulphite particles, and particles of non-combustible black liquor, whose excessive share most clearly indicates the deviation of the combustion conditions from the optimum.

In one application of the invention, the colour characteristic corresponding to sodium sulphite particles comprises a reddish shade, and the corresponding colour characteristic of non-combustible black liquor particles comprises a black shade.

In one application of the invention, the colour characteristic corresponding to sodium sulphite particles comprises the Cr component of the YCbCr colour space, and the corresponding colour characteristic of non-combustible black liquor particles comprises the Y component of the YCbCr colour space. Conversion from the RGB colour space to YCbCr or similar colour space allows for more secure and efficient identification of colour characteristics.

In one application of the invention, the identification of the particle group area comprises thresholding of a corresponding colour characteristic.

In one application of the invention, the determined proportional particle group share of the particle group is used to control a recovery boiler.

In one application of the invention, the sampler is adapted to take a sample from at least two different distances from the wall of the recovery boiler.

With a solution in accordance with the invention, a measurement method may be achieved in order to respond to combustion disturbances significantly faster than previously and, based on flu gas measurements, optimise the combustion process in the combustion chamber. At least some solutions in accordance with the invention enable the measurement results to be used for controlling combustion and/or controlling boiler sweeping.

At least some solutions in accordance with the invention enable the determination of one or more proportional particle group shares from flue gas of a recovery boiler based on optical information gained from a flue gas sample.

At least some solutions in accordance with the invention enable the calculation of the proportional shares at least for sodium sulphite particles, non-combustible black liquor particles and/or for sodium sulphate particles. At least some solutions in accordance with the invention enable the calculation of these proportional shares from the determined areas of a digital image taken from a flue gas sample. At least some solutions in accordance with the invention enable the automatic calculation of these proportional shares. In such cases, for example, a visual comparison to be carried out on the images in a database is not necessary to calculate these proportional shares.

At least some solutions in accordance with the invention enable the measurement history to be taken into account, i.e. comparison with previous measurements. For example, at least some solutions in accordance with the invention enable that a time-stamped result is saved and can be compared with other flue gas samples or any other data collected from the recovery boiler.

At least some solutions in accordance with the invention enable a short measurement time, which can be, for example, at maximum one minute. In addition, a predetermined measurement time enables for its own part fully comparable results as compared to the measurement history.

At least some solutions in accordance with the invention enable obtaining lateral direction information of the recovery boiler from the proportional particle group shares, for example, at several different distances from the front, rear and/or side wall of the recovery boiler.

Further, at least some solutions in accordance with the invention enable flue gas sampling to be reproduced and automated. Automation enables, for example, a high monitoring frequency and quick inspection if the measured proportional particle group share essentially deviates from the expected value.

Preferably, a normal visible region colour camera can be used as a camera that provides results with a sufficiently good correlation.

LIST OF FIGURES

Figure 1B:
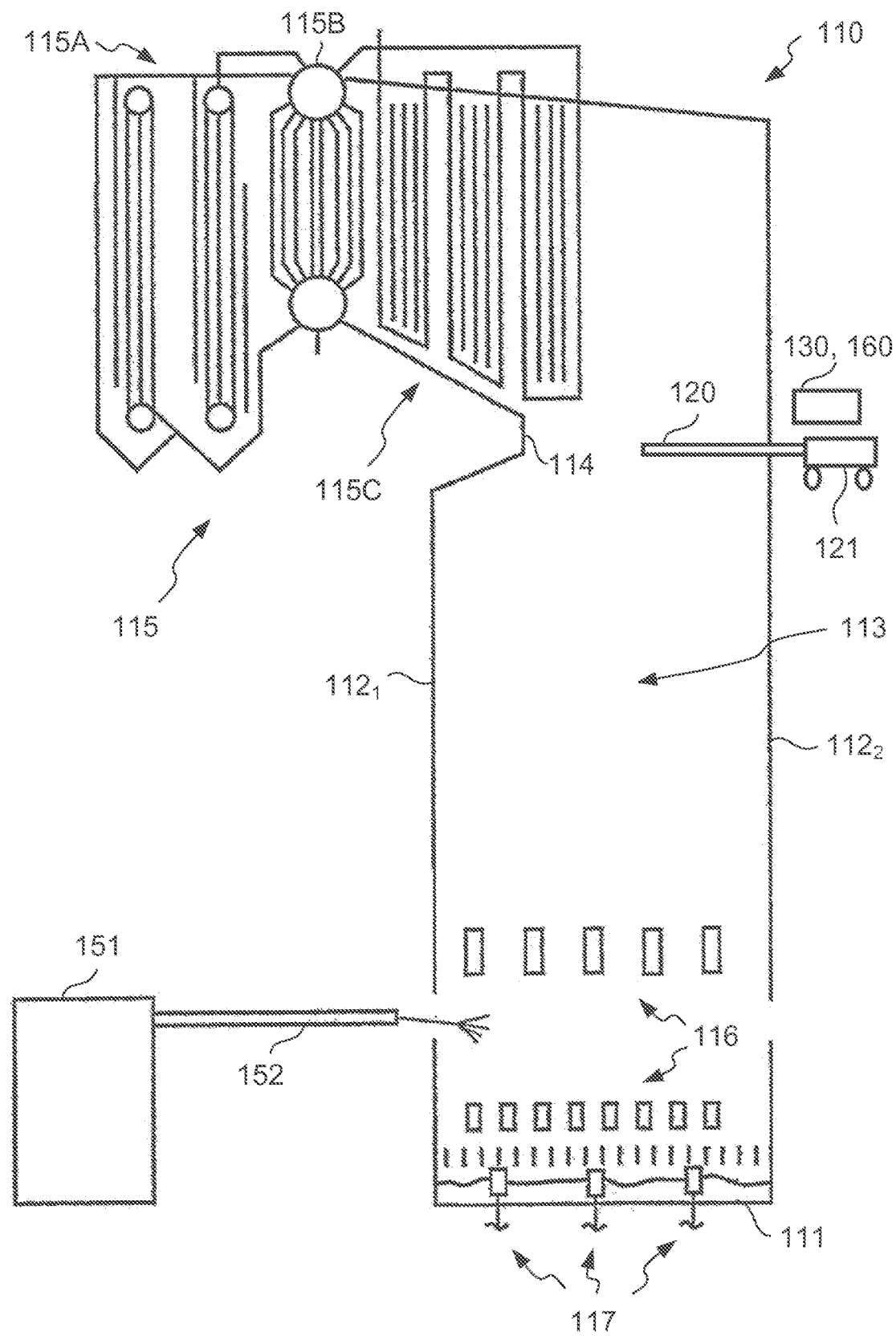
Figure 2:
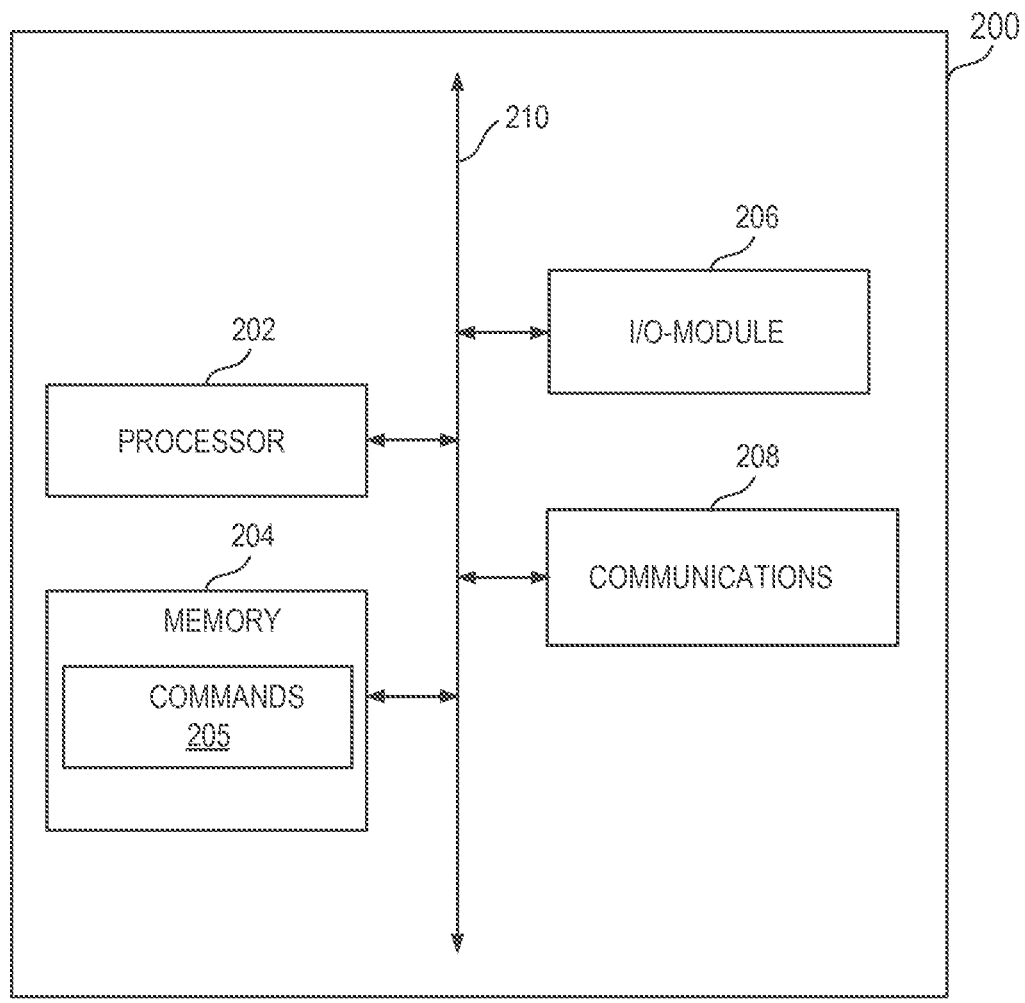
Figure 3:
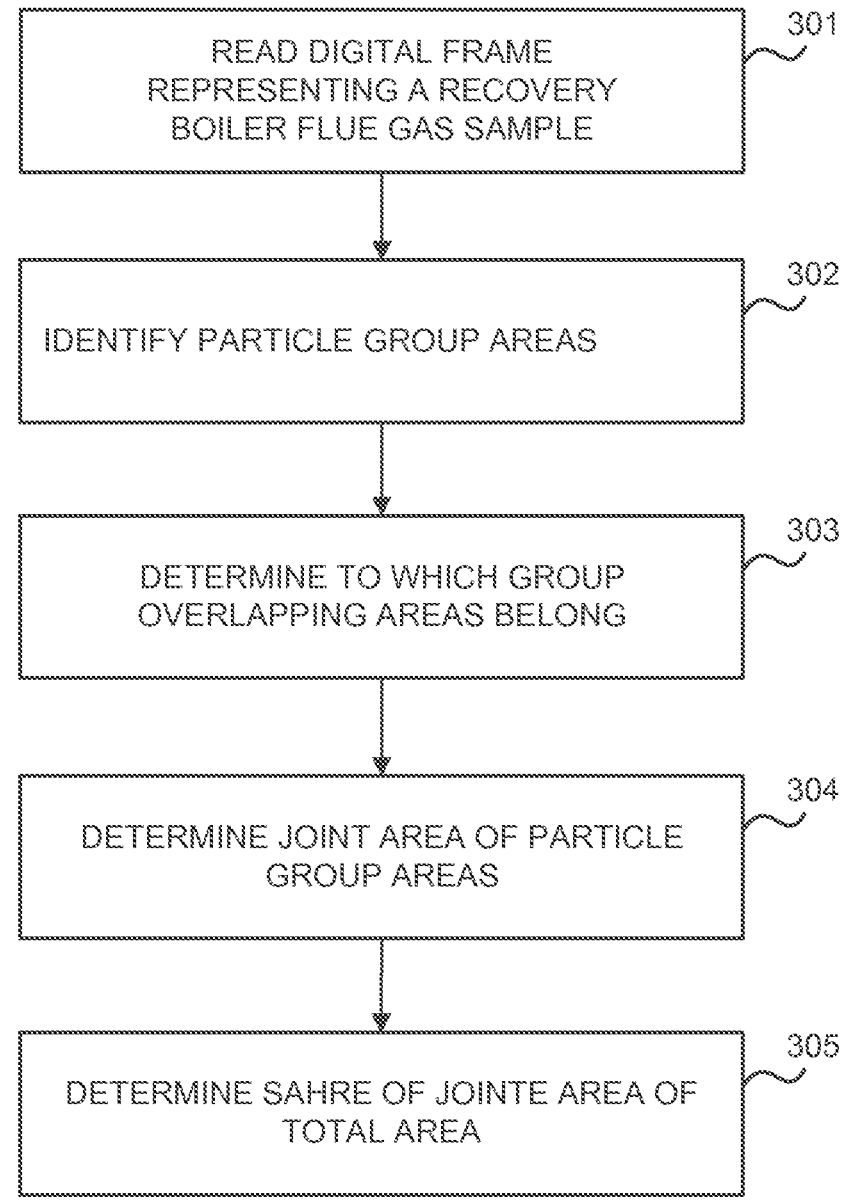
Figure 4A:
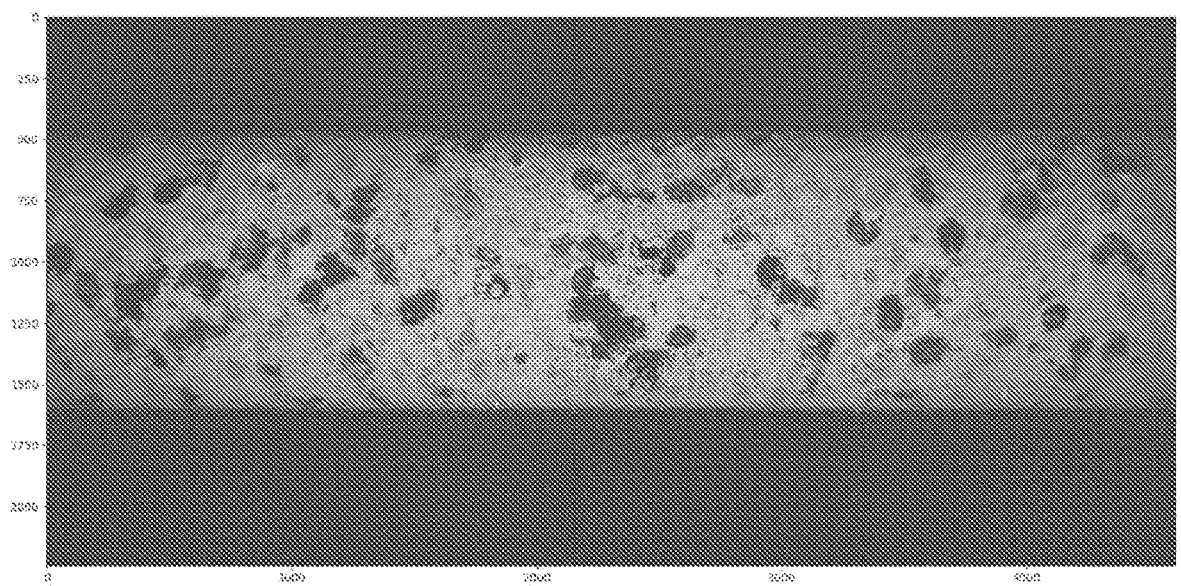
Figure 4B:
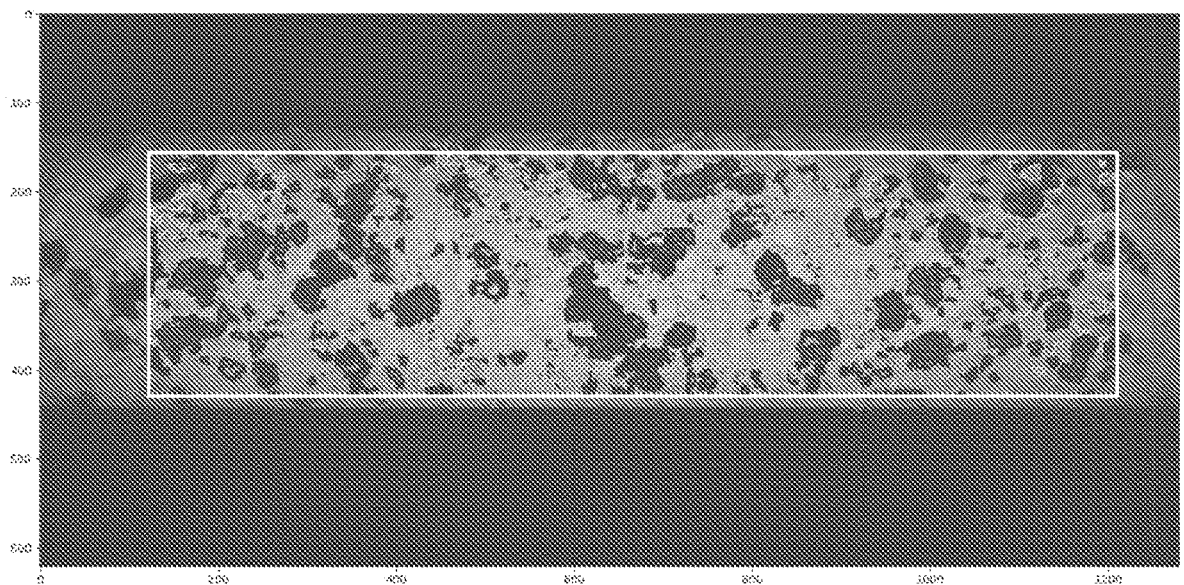
Figure 5A:
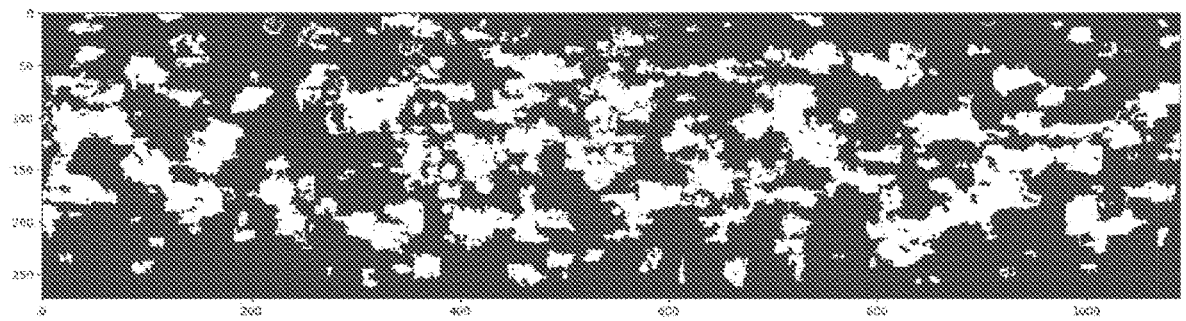
Figure 5B:
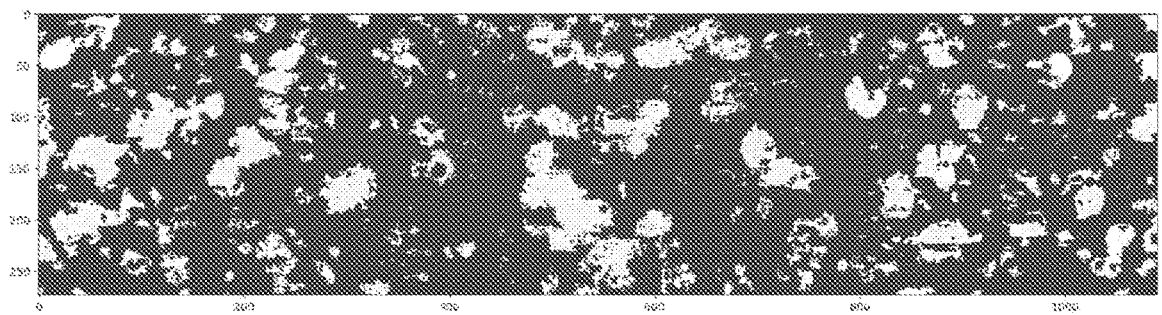

The following describes the invention with the enclosed application examples by referring to the enclosed drawing in which FIG. 1A schematically describes a system in accordance with the invention;

FIG. 1B schematically describes a recovery boiler in accordance with the invention;

FIG. 2 schematically describes a device in accordance with the invention;

FIG. 3 schematically describes a method in accordance with the invention;

FIG. 4A describes an unanalysed digital frame in accordance with the invention;

FIG. 4B describes an analysed digital frame in accordance with the invention;

FIG. 5A describes a binary mask obtained by thresholding, corresponding to sodium sulphite particles in the area under consideration, in accordance with the invention; and FIG. 5B describes a binary mask obtained by thresholding, corresponding to non-combustible black liquor particles in the area under consideration, in accordance with the invention.

The enclosed drawing uses same reference numbers throughout to refer to equivalent elements.

DETAILED DESCRIPTION OF THE INVENTION

Below is a detailed description of the embodiments of the present invention, examples of which are described in the enclosed drawing. The below detailed description, together with the enclosed drawing, is intended to describe examples and not to represent the only ways to implement the provided examples or utilise them. The following highlights example activities and series of stages/operations in order to assemble and use examples. The same or equivalent activities and stages/operations may, however, also be achieved through other examples.

FIG. 1 describes, as an example, the components of a system 100 in accordance with the invention, in which system 100 different embodiments of the present invention may be implemented. The example in FIG. 1A represents the recovery boiler 110, sampler 120, means 130 for generating a digital frame from a sample of particles included in flue gas (or in short, flue gas sample) taken from the recovery boiler 110 with the sampler 120, computer device 200 for determining one or more proportional particle group shares from flue gas of a recovery boiler, and further processing instruments 140.

The recovery boiler 110 is a steam boiler designed to burn black liquor with a dual capacity to act as chemical recovery means and a unit suitable for producing high pressure steam and energy at a pulp mill. The recovery boiler 110 is described in more detail in connection with FIG. 1B.

The sampler 120 may comprise, for example, a sampling bar or rod. In one example, the sampler 120 comprises a sampling bar with a flat, square head. The benefit of a planar sampling surface is that no distortions caused by the shape will appear at the edges of the image taken of it. An image with distortions could, for example, be darker at the edges, which would affect the area values used in the calculation of the proportional particle group shares of flue gas. There may be two or more planar sampling surfaces. The sampling surfaces may be formed, for example, to different sides of a square bar on its tip. If the surfaces are symmetrically located in the vertical direction, lateral variations in the flue gas flow can be observed, because then different amounts of carry-over are accumulated on the surfaces on different sides. However, the proportional particle group shares stay usually the same, but also the calculation of proportional shares becomes more accurate if there are more sampling surfaces. In one example, the sampler 120 is inserted into the flue gas flow approximately at the level of the bullnose, i.e. via the hatches below the bottom ends of the superheaters, in which case the measurement is the most representative of the carry-over particle distribution in the heat transfer section 115 (FIG. 1B).

After sampling, the sampler 120 is taken to the imaging means 130 (for example, a sampling station), where an image is taken of it.

In one example, the sampler 120 is manually operated. In another example, the sampler 120 is automated, for example, using a robot or manipulator. In one example, the in/out movements, photographing and/or cleaning of the sampler 120 are automated, in which case it can be used for active adjustment of the recovery boiler 110.

The means 130 for generating a digital frame may comprise, for example, a sampling station with a camera, a photo booth and stand for placing the sampler 120. The camera may comprise, for example, a digital camera or an analogue camera. In the case of an analogue camera, the means 130 may comprise instruments to digitise the resulting analogue image. In one example, the camera is the camera of a smart phone, tablet or similar. In one example, the camera is an industrial camera. In one example, the camera is a visible region colour camera.

In one example, the sampler 120 is placed in the stand in the sampling station so that its head comprising flue gas particles always enters the photo booth in the same position (e.g. horizontally). In one example, the sampler 120 is photographed so that the sample of the sampler 120 is in the middle of the image and preferably in a predetermined location in the longitudinal direction of the sampler 120.

In one example, the photo booth is illuminated. The conditions of sampling and photographing should be standardised to achieve the best correlation.

The computer device 200 used to determine one or more proportional particle group shares from flue gas of a recovery boiler is described in more detail in the description of FIG. 2.

The further processing instruments 140 may comprise, for example, workstation computers, server computers, databases, and/or data links, etc. with which different further processing operations can be performed or launched (for example, assessing the quality of the operations of the recovery boiler furnace, such as assessing the right-left balance, or assessing the fouling/corrosion proneness of the heating surfaces or assessing the sweeping need) utilising the specified proportional particle group shares of flue gas. In one example, the images taken and the analysis data can be processed with a suitable user interface and/or through a suitable database, for example, in a process control system. The determination results of the proportional particle group shares of flue gas may be used, for example, as measurement data for combustion control and/or for boiler sweeping control.

FIG. 1B schematically describes the recovery boiler 110 in accordance with the invention. FIG. 1B represents the recovery boiler 110, comprising, among other things, a rectangular base 111, four walls $112_1$-$112_4$ (of which FIG. 1B represents the rear wall $112_1$ and front wall $112_2$), a furnace 113, bullnose 114 and heat transfer section 115. The bottom section of the furnace 113 features air holes 116 and smelt spouts 117. The heat transfer section 115 comprises, e.g., economisers 115A, cooking piping 115B and superheaters 115C.

In addition, FIG. 1B represents the sampler 120 in accordance with the invention, the optical manipulator 121 of the sampler 120, and the imaging means 130 and the optional washing station 160 of the sampler 120.

Furthermore, FIG. 1B describes an evaporator 151, which evaporates excess water from black liquor, and lye spray(s) 152, used for spraying black liquor after evaporation into the recovery boiler 110. In other words, by means of lye sprays 152, a suitable drop size and correct alignment, the aim is to form a desired pile of black liquor on the bottom 111 of the recovery boiler 110.

The recovery boiler 110 furnace 113 walls $112_1$-$112_4$ are typically made of vertical piping (not represented in FIG. 1B), which have been connected to each other gas-tightly so that the piping forms continuous cooking piping. Water flowing inside the piping is vaporised in the furnace 113 by the thermal energy being released and, eventually, the saturated water steam mixture formed in the cycle is directed to a steam drum (not represented in FIG. 1B), where steam and water are separated and steam is directed to the superheaters 115C for superheating. During operation, the recovery boiler 110 bottom 111 is completely covered with a layer of chemical smelt and the aim is to form a controlled pile comprising of inorganic matter and coke on the bottom of the boiler. The final combustion of the organic matter of black liquor and the reduction of the chemicals occur in the pile under conditions low in oxygen. The smelt spouts 117 are used to drain chemical smelt away from the boiler bottom 111 into a dissolving tank (not represented in FIG. 1B).

For the combustion air to be fed into the recovery boiler 110, the recovery boiler 110 usually has three air levels: primary, secondary and tertiary with their respective air holes 116. They all have their own effect on the combustion air supply needed for the combustion of black liquor. In deviation to FIG. 1B, the smelt spouts and air holes are typically located on the front and/or rear walls $112_1$, $112_2$, because they are wider than the side walls $112_3$-$112_4$.

The superheaters 115C are usually in the top section of the recovery boiler 110 protected by a projection 114, i.e. the bullnose, which protects the superheaters 115C from direct thermal radiation and controls the flue gas flow to the superheaters 115C. After the superheaters 115C, the flue gases generated during combustion are led into the cooking piping 115B, where the heat of the flue gases is used for steam production. Usually, the flue gases contain high amounts of ash, which is tried to be removed from the heat transfer surfaces by regular steam sweeping. This ash extracted from the ash hoppers of the flue gas ducts and from an electrostatic precipitator is recovered and the recovered ash is mixed with black liquor and sprayed into the boiler furnace 113 for the recovery of chemicals.

The recovery boiler 110 usually features two feed water preheaters, i.e. economisers, 115A, located in the vertical flue gas ducts. The feed water preheaters 115A heat feed water before it is fed into the cooking piping 115B. The preheaters 115A improve the efficiency of the recovery boiler 110 and allow flue gases to be cooled down close to the feed water temperature. The economisers 115A in the flue gas flow must also be regularly swept with steam sweeping to keep them open.

FIG. 2 is a block diagram of a computer device 200 in accordance with one embodiment.

The computer device 200 comprises at least one processor 202, and at least one memory 204 containing computer program code 205. The computer device 200 may also comprise an input/output module 206, and/or a communication interface 208.

Although the computer device 200 in FIG. 2 is presented as including only one processor 202, the computer device 200 may include several processors. In one embodiment, commands 205 may be saved in the memory 204 (for example, operating system and/or different applications). In addition, the processor 202 can be used to implement saved commands. In one embodiment, the processor 202 may be implemented as a multicore processor, a single-core processor, or a combination of one or more multicore processors and one or more single-core processors. The processor 202 may, for example, be implemented as one or more different processing devices, such as a coprocessor, microprocessor, controller, DSP (digital signal processor), processing circuit with or without a DSP, or various other processing devices including an ASIC (application specific integrated circuit), FPGA (field programmable gate array), microcontroller unit, hardware accelerator, or similar. In one embodiment, the processor 202 can be left to perform a hard-coded functionality. In one embodiment, the processor 202 has been implemented as an executor of software commands and the processor 202 can be configured with commands to run algorithms and/or operations described in this report when commands are run.

The memory 204 may be implemented as one or more volatile memory devices, one or more non-volatile memory devices, and/or a combination of one or more volatile memory devices or one or more non-volatile memory devices. The memory 204 can be implemented, for example, as a semiconductor memory, such as PROM (programmable ROM), EPROM (erasable PROM), flash ROM, RAM (random access memory), etc.

The input/output module 206 has been arranged to assist in the organisation of input and/or output. The input/output module 206 has been arranged to communicate with the processor 202 and the memory 204. Examples of the input/output module 206 include but are not limited to an input interface and/or output interface. Examples of the input interface include but are not limited to a keyboard, touch screen, microphone, etc. Examples of the output interface include but are not limited to a speaker, display, such as a LED display, TFT display, liquid crystal display or AMO-LED display, etc.

The communication interface 208 may enable the computer device 200 to communicate with other devices. In one embodiment, the different components of the computer device 200, such as the processor 202, memory 204, input/output module 206 and communication interface 208, have been arranged to communicate with each other through a centralised circuit 210. The centralised circuit 210 may comprise a pressed circuit board, such as a motherboard or equivalent.

The computer device 200 described and explained here is only an example of a device that may benefit from the embodiments of the invention, and it is not intended to limit the protective circuit of the invention. Note that the computer device 200 may include a different number of components than what is represented in FIG. 2. The computer device 200 can be divided into several physical units that communicate through a suitable communication link.

The above-mentioned memory/memories 204 and computer program code 205 have been arranged with at least one processor 202 to make the computer device 200 read the digital frame, which comprises the area under consideration. This area under consideration represents at least part of the surface of the sampler 120 kept in the flue gas flow of the recovery boiler 110 for a predetermined period of time. In one example, this predetermined time is at maximum one minute. In another example, this predetermined time is at maximum a half a minute. In one embodiment, the computer device 200 receives a readable digital frame. In another embodiment, the computer device 200 retrieves a readable digital frame. In one example, one or more digital frames have been saved in a database from which the computer device 200 retrieves them. Such database can be integrated into the computer device 200 or separated from the computer device 200 and connected to it with a suitable communication link. In one example, the area under consideration comprises an area in the middle of the digital frame so that one or more edge areas of the digital frame have been cropped. This cropping can be used to remove from the digital frame, for example, an image area including the surroundings of the flue gas particle sample. In other words, in the specification of the area under consideration, the digital frame is cropped to exclude the unwanted areas that could distort the calculation of the proportional particle group shares of flue gas. The edge areas of the digital frame are unwanted, for example, when the area of the flue gas particle sample does not extend to them. In one embodiment, the area under consideration is rectangular.

The above-mentioned memory/memories 204 and computer program code 205 have been further arranged with at least one processor 202 to make the computer device 200 identify from the area under consideration one or more particle group areas matching the predetermined colour characteristic of at least one particle group included in flue gas of the recovery boiler 110. In one example, the particle group comprises one of the following: sodium sulphite particles (sodium sulphite, $Na_2SO_3$), and particles of non-combustible black liquor. In one example, the colour characteristic corresponding to sodium sulphite particles comprises a reddish shade, and the corresponding colour characteristic of non-combustible black liquor particles comprises a black shade.

The other carry-over particles are predominantly light grey and their identification from the background material is more uncertain. However, they can be similarly identified and taken into account as their own particle group area. In this case, the proportions of the areas of sodium sulphite particles and/or non-combust black liquor can be compared with their proportion of the total area covered by the particles and not with the total area of the area under consideration. In this case, the proportion of the total area covered by particles may also be calculated of the total area of the area under consideration. This allows correlation of the total amount of carry-over, for example, with the prior art Sootprobe™, which allows the estimation of the growth rate of the layers on the heat exchanger surfaces.

When the predetermined time for sampling is sufficiently long, for example 25 s, or preferably 30 s or more, the surface of the sampler is usually substantially covered by particles all over. In this case, it is sufficient to identify only the sodium sulphite particles and/or non-combustible black liquor particles and to determine their areas and their proportion of the total area of the area under consideration.

In one example, the colour characteristic corresponding to sodium sulphite particles comprises the Cr component of the YCbCr colour space, and the corresponding colour characteristic of non-combustible black liquor particles comprises the Y component of the YCbCr colour space. The YCbCr is a colour space/colour model where colours are created by combining one luma component and two chroma components. Luma (Y component) is the brightness information (luminance) of the image with gamma correction, the Cb component represents the yellow-blue variation, and the Cr component represents the green-red variation.

The above-mentioned memory/memories 204 and computer program code 205 have been further arranged with at least one processor 202 to make the computer device 200 determine the joint area of the identified one or more particle group areas.

The above-mentioned memory/memories 204 and computer program code 205 have been further arranged with at least one processor 202 to make the computer device 200 determine the share of the determined joint area from the predetermined total area as the proportional particle group share of the said particle group. In one example, the predetermined total area comprises the total area of the area under consideration.

In one embodiment, there are at least two particle groups of interest. In this case, the identification of the particle group area, the determination of the joint area and the determination of the joint area from the total area is carried out separately for these at least two particle groups. In this embodiment, the predetermined total area may comprise either the total area of the area under consideration or the total area of the joint areas of the said at least two different particle groups.

In the following examples, flue gas includes three particle groups: sodium sulphite particles (reddish shade), non-combustible black liquor particles (black shade), and other particles (e.g. sodium sulphate particles, i.e. ash, grey shade).

In the first example, only sodium sulphite particles are identified. All sodium sulphite particle areas, i.e. the reddish shade areas, are identified from the area under consideration. Then, the joint area of all identified sodium sulphite particle areas is determined as the joint area. In this example, the total area is the total area of the area under consideration. Finally, the proportion of the joint area of the identified sodium sulphite particle areas is determined in view of the total area of the area under consideration, and the thus obtained value is considered as the proportional share of the sodium sulphite particles.

In the second example, only non-combustible black liquor particles are identified. All non-combustible black liquor particle areas, i.e. the black shade areas, are identified from the area under consideration. Then, the joint area of all identified non-combustible black liquor particle areas is determined as the joint area. In this example, the total area is the total area of the area under consideration. Finally, the proportion of the joint area of the identified non-combustible black liquor particle areas is determined in view of the total area of the area under consideration, and the thus obtained value is considered as the proportional share of the non-combustible black liquor particles.

In the third example, both the sodium sulphite particles and the non-combustible black liquor particles are identified. All sodium sulphite particle areas, i.e. the reddish shade areas, and all non-combustible black liquor particle areas, i.e. the black shade areas, are identified from the area under consideration. Then, the sum of the joint area of all identified sodium sulphite particle areas and the joint area of all identified non-combustible black liquor particle areas is determined as the joint area. In this example, the total area is the total area of the area under consideration. Finally, the proportion of the sum of the joint area of the identified sodium sulphite particle areas and the joint area of the identified non-combustible black liquor particle areas is determined in view of the total area of the area under consideration, and the thus obtained value is considered as the proportional share of the sum of the sodium sulphite particles and non-combustible black liquor particles.

In the fourth example, both the sodium sulphite particles and the non-combustible black liquor particles are identified. All sodium sulphite particle areas, i.e. the reddish shade areas, and all non-combustible black liquor particle areas, i.e. the black shade areas, are identified from the area under consideration. Then, the joint area of only the identified sodium sulphite particle areas is determined as the joint area. In this example, the sum of the joint area of the identified sodium sulphite particle areas and the joint area of all identified non-combustible black liquor particle areas is the total area. Finally, the proportion of the joint area of the identified sodium sulphite particle areas to the sum of the joint area of the identified sodium sulphite particle areas and of the joint area of the identified non-combustible black liquor particle areas is determined, and the thus obtained value is considered as the proportional share of the sodium sulphite particles.

In the fifth example, both the sodium sulphite particles and the non-combustible black liquor particles are identified. All sodium sulphite particle areas, i.e. the reddish shade areas, and all non-combustible black liquor particle areas, i.e. the black shade areas, are identified from the area under consideration. Then, the joint area of only the identified sodium sulphite particle areas is determined as the joint area. In this example, the total area is the joint area of the identified non-combustible black liquor particle areas. Finally, the proportion of the joint area of the identified sodium sulphite particle areas to the joint area of the identified non-combustible black liquor particle areas is determined, and the thus obtained value is considered as the proportional share of the sodium sulphite particles.

The invention is not limited to concern only the five examples described above, but many other variations are possible.

In one embodiment, the above-mentioned memory/memories 204 and computer program code 205 have been further arranged with at least one processor 202 to make the computer device 200 determine that at least one possible overlapping area of the particle group areas belongs to one of the said particle group areas based on the darkness of the said possible overlapping area.

In one embodiment, the identification of the particle group area comprises thresholding of a corresponding colour characteristic. In this text, thresholding refers to an operation, where the pixels of the area under consideration, whose specific value exceeds a specific limit value, are assigned with the first binary value (e.g. '1'), and the pixels of the area under consideration, whose value is less than this limit value, are assigned with the second binary value (e.g. '0'). If a pixel value is equal to the limit value, it can be assigned with the first binary value or the second binary value as seen appropriate. So, the result of thresholding is a binary image.

In one embodiment, the determined proportional particle group share of the particle group is used to control the recovery boiler 110, for example for controlling combustion and/or controlling boiler sweeping. In one example, the control system of the recovery boiler 110 is given information of each determined relative particle group share. In one example, the air and/or fuel supply of the recovery boiler 110 is adjusted according to at least one of the determined proportional particle group shares.

The proportional particle group shares, requiring changes in the control of the recovery boiler 110, vary boiler-, load- and/or fuel-specifically. Typically, changes are not made to the adjustments, if steam is produced evenly and sufficiently, and the chemical cycle has not been disturbed. Increase in carry-over is due to the variations in the furnace reaction and events, which steer the combustion process off balance (steam and chemicals). Decrease in carry-over does not in itself usually cause adjustment measures. In one example, rough action limits are approx. 10% for the non-combustible black liquor particles and approx. 15% for the sodium sulphite particles, and approx. 20% for their combined share.

In one embodiment, the above-mentioned memory/memories 204 and computer program code 205 have been further arranged with at least one processor 202 to make the computer device 200 determine the proportional share of the sodium sulphate particles (sodium sulphate, $Na_2SO_4$) for example by deducting from the total area the joint area of the sodium sulphite particles and the joint area of the non-combustible black liquor particles.

In one embodiment, the digital frame includes sampling information which comprises at least the sampling time (e.g. time stamp) of the flue gas particle sample represented by the frame. The use of time stamps and other similar things enables, for example, the creation of a time-stamped trend that can be viewed for a desired time period.

In one embodiment, a predetermined time can be changed, if the joint area exceeds or falls below the predetermined limit value.

The following describes in more detail one application example of the invention. Some steps in this application example are optional.

At first, the predetermined value areas of the consideration can be read for the components of the YCbCr colour model, and the predetermined minimum and maximum particle sizes for the sodium sulphite particles and non-combustible black liquor particles. Minimum and maximum sizes can be determined in pixels for the particles to be identified. Based on the size, a selection can be made whether the identified particle is of a size making the identification credible.

An image is taken of the flue gas particle sample. FIG. 4A represents an example of an image 410 taken of such a flue gas particle sample. The image can be rotated to a horizontal position so that the width->height, and/or the image can be scaled to a predetermined width (original aspect ratio).

Then, the area to be considered is selected.

After this, for example, conversion from the RGB (Red, Green, Blue) colour model to the YCbCr colour model is possible. The colour model conversion RGB->YCbCr can be done with an appropriate colour model conversion function. The benefit of using the YCbCr colour model is that red and red-shade particles can be distinguished from blue-grey areas based on shade.

Blank result images can be created for sodium sulphite particles and non-combustible black-liquor particles to be identified. In other words, the result images of the thresholding operations, i.e. the binary masks, are first formatted empty.

The sodium sulphite particles can be selected from the image by thresholding the components of the YCbCr colour model so that the Y (luminance) and Cb (yellow-blue) components have fixed value areas, and the Cr (green-red) component value area is made narrower in steps within the limits of the value area so that in the phase of each step the mask resulting from thresholding is considered and the areas, which fulfil the area conditions (the size of the threshold area shall be between the minimum and maximum sizes) predetermined for the sodium sulphite particles, are selected for the result image. FIG. 5A describes a binary mask (510) obtained by thresholding, corresponding to sodium sulphite particles in the area under consideration, in accordance with the invention. In FIG. 5A, white is 1 and black is 0, i.e. white refers to an area identified as a hit for sodium sulphite particles and black to other areas.

The non-combustible black liquor particles can be selected from the image by thresholding the components of the YCbCr colour model so that the Cb and Cr components have fixed value areas, and the Y component value area is made narrower in steps within the limits of the value area so that in the phase of each step the mask resulting from thresholding is considered and the areas, which fulfil the area conditions (the size of the threshold area shall be between the minimum and maximum sizes) predetermined for the non-combustible black liquor particles, are selected for the result image. FIG. 5B describes a binary mask 520 obtained by thresholding, corresponding to non-combustible black liquor particles in the area under consideration, in accordance with the invention. In FIG. 5B, white is 1 and black is 0, i.e. white refers to an area identified as a hit for non-combustible black liquor particles and black to other areas.

In other words, individual images to be analysed can be processed as 3-component (Y, Cb, Cr) read matrices, which are subjected to a selection based on thresholding operations. In thresholding, the selection is made by setting threshold values for the different image components. The thresholding operation yields as a result a binary image, i.e. a mask (one-component matrix) where, for example, areas fulfilling the threshold values are marked with the value True (white) and the other areas False (black). For each image to be analysed, thresholding of the image components can be carried out several times with different limit values, the result images of the thresholding operations, i.e. binary masks, can be added to one joint result image, and the result is a single result image including the results of all the thresholding operations. FIG. 4B describes an analysed digital frame 420 in accordance with the invention that represents the area to be considered and the sodium sulphite particles and non-combustible black liquor particles identified inside the area under consideration. In FIG. 4B, the area under consideration is marked with a white rectangle.

The post-review of the produced mask images is performed so that if the mask images represent intersections, the low-intensity areas at the intersections of the sodium sulphite particle mask image and the non-combustible black liquor particle mask image are marked as a component of the non-combustible black liquor particles. In other words, in overlapping hits, i.e. in possible intersections of the masks, the darkness of the overlapping area is considered so that if the intersection is darker than the value set as the limit value, it is marked as an area of the non-combustible black liquor particles and otherwise it is marked as an area of the sodium sulphite particles.

Then, the area percentages are calculated in the area under consideration, i.e. how much the mask images of the sodium sulphite particles and non-combustible black liquor particles cover in percentages of the area under consideration. In addition, the area covered by sodium sulphate particles, i.e. ash, can be calculated as follows:

> 100−(area percentage of the sodium sulphate particle area+area percentage of the non-combustible black liquor particle area) %, if the time period has been long enough to yield full coverage.

The identification of colour characteristics can result in the identification of an area into two different particle group areas. Preferably, when calculating percentages, the possible overlap of the obtained image masks of the sodium sulphite particles and the non-combustible black liquor particles is taken into consideration to allow reliable calculation of the area percentages. The overlapping areas are processed, for example, so that at the intersections of the sodium sulphite particle mask image and the non-combustible black liquor particle mask image the areas in the sodium sulphite particle mask, which are on average darker in terms of their intensity value, for example, areas darker than the specified threshold value, are selected in the mask image of the non-combustible black liquor particles and the other intersecting areas are left in the mask image of the sodium sulphite particles.

FIG. 3 represents an example flow chart of a method 300 to determine one or more proportional particle group shares from flue gas of a recovery boiler in accordance with the example embodiment.

In the operation 301, a processor is used to read a digital frame, which comprises the area under consideration, which represents at least a part of the surface of the sampler kept in the flue gas flow of a recovery boiler for a predetermined period of time.

In the operation 302, a processor is used to identify from the area under consideration one or more particle group areas matching the predetermined colour characteristic of at least one particle group included in flue gas of the recovery boiler.

In the optional operation 303, a processor is used to determine at least one possible overlapping area of the particle group areas belongs to one of the said particle group areas based on the darkness of the said possible overlapping area.

In the operation 304, a processor is used to determine the joint area of the identified one or more particle group areas.

In the operation 305, a processor is used to determine the share of the determined joint area from the predetermined total area as the proportional particle group share of the said particle group.

The method 300 can be performed with the device 200 of FIG. 2. The additional characteristics of the method 300 are direct results of the operations and parameters of the device 200, so they are not repeated here. The method 300 can be performed with one or more computer programs.

Example embodiments may include, for example, any suitable computer devices and equivalent that are capable of running processes of example embodiments. The devices and subsystems of example embodiments can communicate with each other using any suitable protocol, and they can be implemented using one or more programmed computer systems or devices.

One or more connection mechanisms, including an Internet connection, telecommunication in any suitable format (voice, modem, etc.), wireless communication media and equivalent, can be used with the example embodiments. The communication networks or connections may include, for example, one or more satellite communication networks, wireless communication networks, cellular communication networks, 3G communication networks, 4G communication networks, 5G communication networks, a general switched telephone network, package data networks, the Internet, intranets or combinations of these.

Let it be understood that the example embodiments are just examples because the many variations of the specific equipment used to implement the example embodiments are possible, as professionals of the field understand. For example, the functionality of one or more components of the example embodiments can be implemented through hardware and/or software.

The example embodiments can save information related to the different processes described in this report. This information can be saved in one or more memories, such as a hard disk, optical disk, magnetic-optical disk, RAM memory, etc. Information used to implement the example embodiments of the present invention can be saved in one or more databases. Databases can be organised using data structures (for example, data records, tables, boards, fields, graphs, trees or lists) included in one or more memories or storage media listed here. As regards example embodiments, the described processes may include appropriate data structures for saving the data collected and/or generated by processes of devices and subsystems of the example embodiments into one or more databases.

The example embodiments may be implemented in whole or in part using one or more general-purpose processors, microprocessors, DSP processors, microcontrollers, etc. programmed in accordance with the teachings of the example embodiments of the present invention, as professionals of the field understand. An average programmer can easily produce appropriate software based on the teachings of the example embodiments, as professionals of the software field understand. In addition, the example embodiments can be implemented using application-specific integrated circuits or combining conventional component circuits of the appropriate network, as professionals of the electronics field understand. Therefore, the example embodiments are not limited to any specific combination of hardware and/or software.

Saved in any computer-readable media or a combination thereof, the example embodiments of the present invention may comprise software for controlling the components of the example embodiments, running components of the example embodiments, enabling interaction between components of the example embodiments and human users, etc. Such software may include but is not limited to device drivers, firmware, operating systems, software development tools, application software, etc. These computer-readable media may include the computer program product of the embodiment of the present invention for executing processes in the implementation of the invention in whole or in part (if processing is distributed). The computer devices of the example embodiments of the present invention may include any suitable interpretable or executable code mechanisms, including but not limited to command scripts, interpretable programs, dynamic link libraries, Java classes and applets, entirely executable programs, etc. In addition, parts of the processing of the example embodiments of the present invention may be distributed in order to improve performance, reliability, costs, etc.

As stated above, components of the example embodiments may include a computer-readable medium or memory to store commands programmed according to the teachings of the present invention as well as data structures, tables, data records and/or other data described in this report. The computer-readable medium may comprise any suitable medium that participates in organising commands to be performed by the processor. Such medium may have several forms, including but not limited to a non-volatile or permanent storage medium, volatile or non-permanent storage medium, etc. Non-volatile storage media may comprise optical or magnetic disks, etc. Volatile storage media may comprise dynamic memories, etc. General forms of computer-readable media may include a floppy disk, hard drive or any other medium that can be read by a computer.

The invention is not limited to concern only the application examples described above; many variations are possible within the framework of the invention idea specified by the patent claims.

The invention claimed is:

1. A method for determining a proportion of one or more particle groups in flue gas from a recovery boiler, the method comprising:
   reading, with a processor, a digital frame including an image of an area under consideration representing at least a part of a surface of a sampler after the surface is in the flue gas flow of the recovery boiler for a period of time;
   identifying, with the processor, in the image of the area under consideration one or more first particle group areas matching a first predetermined color characteristic of a first particle group included in the flue gas of the recovery boiler and a second predetermined color characteristic of one or more second particle groups included in the flue gas, wherein the second predetermined color characteristic differs from the first color characteristic and the second particle group differs from the first particle group;
   determining, with the processor, a first joint area representing a combined area of the one or more first particle group areas; and
   determining, with the processors, a first share of the first joint area of a predetermined total area of the sampler, wherein the first share is a portion of the predetermined total area attributable to the one or more first particle group areas.

2. The method according to claim 1, further comprising:
   determining, with the processor, a second joint area representing a combined area of the one or more second particle group areas; and
   determining, with the processor, a second share of the predetermined total area attributable to the one or more second particle group areas.

3. The method according to claim 1, wherein the predetermined total area comprises a total area of the area under consideration.

4. The method according to claim 1, wherein the predetermined total area comprises a total surface area of the first and second joint areas.

5. The method according to claim 1, further comprising:
   determining, with the processor, at least one possible overlapping area of the at least one first particle group areas and the at least one second particle group areas.

6. The method according to claim 1, wherein the first particle group comprises one of: sodium sulphite particles, and non-combustible black liquor particles.

7. The method according to claim 1, wherein
   the first predetermined color characteristic corresponds to sodium sulphite particles and is represented by a reddish shade, and
   the second predetermined color characteristic corresponds to non-combustible black liquor particles and is represented by a black shade.

8. The method according to claim 1, wherein:
   the first predetermined color characteristic corresponds to sodium sulphite particles and is represented by a Cr component of a YCbCr color space, and
   the second predetermined color characteristic corresponds to non-combustible black liquor particles and is represented by a Y component of the YCbCr color space.

9. The method according to claim 1, wherein the identifying the at least one first particle group areas comprises thresholding of the first predetermined color characteristic.

10. The method according to claim 1, further comprising using at least of the first share and the second share to control the recovery boiler.

11. A computer device comprising:
   at least one processor; and
   at least one memory storing a non-transitory computer program code,
   wherein the at least one memory and the computer program code are accessible by at least one processor and the at least one processor executes the computer program code to make the computer device:
   read a digital frame, wherein the digital frame comprises an image of an area of at least a portion of a surface of a sampler which had been in flue gas generated by of a recovery boiler;
   identify in the image one or more first particle group areas matching a first color characteristic of a first particle group in the flue gas of the recovery boiler;
   identify in the image one or more second particle areas matching a second color characteristic of a second particle group in the flue gas, wherein the second color characteristic differs from the first color characteristic and the second particle group differs from the first particle group;
   determine a first joint area representing a combined area of the one or more first particle group areas;
   determine a second joint area representing a combined area of the one or more second particle group areas and
   determine a first value representing a portion of a predetermined total area corresponding to the one or more first particle group areas, wherein the predetermined total area is at least a portion of the surface of the sampler, and
   determine a second value representing a portion of the predetermined total area corresponding to the second joint area.

12. The computer device according to claim 11, wherein the predetermined total area comprises the total area of the area under consideration.

13. The computer device according to claim 11, wherein the predetermined total area comprises combined area of the first joint area and the second joint area.

14. The computer device according to claim 11, wherein the at least the one non-transitory memory and the computer program code are accessible by the at least the one processor which, when executing the computer program code, makes the computer device determine an overlapping area of the at least one first particle group areas and the at least one second particle group areas based on a darkness of the overlapping area.

15. The computer device according to claim 11, wherein the first particle group comprises one of: sodium sulphite particles, and non-combustible black liquor particles.

16. The computer device according to claim 11, wherein;
   the first color characteristic corresponds to sodium sulphite particles and is represented by a reddish shade, and the second color characteristic corresponds to non-combustible black liquor particles and is represented by a black shade.

17. The computer device according to claim 11, wherein:
the first color characteristic corresponds to sodium sulphite particles and is represented by a Cr component of a YCbCr color space, and
the second color characteristic corresponds to non-combustible black liquor particles and is represented by a Y component of the YCbCr color space.

18. The computer device according to claim 11, wherein the identifying the one or more first particle group areas comprises thresholding of the first color characteristic.

19. The computer device according to claim 11, further comprising using at least one of the first share or the second share to control the recovery boiler.

20. A system comprising:
the sampler configured to collect at least one sample from the flue gas of the recovery boiler; and
a camera configured to generate the digital frame from the sample taken with the sampler from the recovery boiler; and
the computer device according to claim 11.

21. The system according to claim 20, wherein the sampler is adapted to take the at least one sample of the flue gas from within the recover boiler at different distances from a wall of the recovery boiler.

* * * * *